United States Patent
Andreuzzi et al.

(10) Patent No.: US 11,181,381 B2
(45) Date of Patent: Nov. 23, 2021

(54) PORTABLE PEDESTRIAN NAVIGATION SYSTEM

(71) Applicant: INTERNATIONAL BUSINESS MACHINES CORPORATION, Armonk, NY (US)

(72) Inventors: Mauro Andreuzzi, Amelia (IT); Marco Barboni, Rome (IT); Stefania Brigazzi, Rome (IT); Donatello Le Donne, Rome (IT); Maria Morbidelli, Rome (IT); Sandro Piccinini, Rome (IT); Ignazio F. Trovato, Rome (IT); Aurora Vogna, Rome (IT); Antonio Zasa, Rome (IT)

(73) Assignee: International Business Machines Corporation, Armonk, NY (US)

( * ) Notice: Subject to any disclaimer, the term of this patent is extended or adjusted under 35 U.S.C. 154(b) by 209 days.

(21) Appl. No.: 16/162,455

(22) Filed: Oct. 17, 2018

(65) Prior Publication Data
US 2020/0124420 A1    Apr. 23, 2020

(51) Int. Cl.
*G01C 21/20*    (2006.01)

(52) U.S. Cl.
CPC .................................. *G01C 21/20* (2013.01)

(58) Field of Classification Search
CPC ....................................................... G01C 21/20
See application file for complete search history.

(56) References Cited

U.S. PATENT DOCUMENTS

| 7,194,148 | B2 * | 3/2007 | Yavitz | G06F 40/20 382/305 |
| 7,864,991 | B2 * | 1/2011 | Espenlaub | G09B 21/006 340/539.11 |
| 9,140,554 | B2 * | 9/2015 | Jerauld | A61F 9/08 |
| 9,384,679 | B2 | 7/2016 | Alalawi | |
| 9,836,996 | B2 * | 12/2017 | Kanuganti | H04N 21/2743 |
| 10,078,971 | B2 * | 9/2018 | Kanuganti | H04N 21/25841 |

(Continued)

FOREIGN PATENT DOCUMENTS

CA    2898387 A1    1/2017

OTHER PUBLICATIONS

Espiridion et al., "GPS-Based Walking Aid for the Visually Impaired with Proximity Sensors and Audio Assist", A Thesis Presented to the Faculty of the Department of Electronics & Communications Engineering, College of Engineering, De La Salle University, Jun. 2014, 44 pages.

(Continued)

*Primary Examiner* — Thomas G Black
*Assistant Examiner* — Tarek Elarabi
(74) *Attorney, Agent, or Firm* — Robert D. Bean (57) ABSTRACT

A portable pedestrian navigation system including a computing device, a proximity sensor and an output device. The proximity sensor and the output device are communicatively coupled to the computing device and the computing device is adapted for receiving environmental data at least from the proximity sensor. Based on the environmental data, A candidate guide entity near the pedestrian is identified. Based on the environmental data, the output device is used for guiding the pedestrian in accordance with a movement of the identified candidate guide entity as a selected guide entity.

20 Claims, 2 Drawing Sheets

(56) References Cited

U.S. PATENT DOCUMENTS

| | | | |
|---|---|---|---|
| 2006/0004512 A1* | 1/2006 | Herbst | G01C 21/206 |
| | | | 701/431 |
| 2007/0018890 A1 | 1/2007 | Kulyukin | |
| 2007/0238074 A1* | 10/2007 | Espenlaub | G09B 21/006 |
| | | | 434/112 |
| 2007/0296572 A1* | 12/2007 | Fein | G08G 1/096816 |
| | | | 340/539.13 |
| 2010/0292917 A1* | 11/2010 | Emam | G01C 21/26 |
| | | | 701/533 |
| 2011/0307172 A1 | 12/2011 | Jadhav et al. | |
| 2013/0079061 A1* | 3/2013 | Jadhav | H04M 1/72588 |
| | | | 455/563 |
| 2013/0131985 A1 | 5/2013 | Weiland et al. | |
| 2013/0155245 A1* | 6/2013 | Slamka | H04N 7/185 |
| | | | 348/158 |
| 2013/0218456 A1 | 8/2013 | Zelek et al. | |
| 2013/0271607 A1* | 10/2013 | Takahashi | G01C 21/30 |
| | | | 348/148 |
| 2014/0100773 A1* | 4/2014 | Cunningham | A61H 3/061 |
| | | | 701/431 |
| 2014/0184384 A1 | 7/2014 | Zhu | |
| 2015/0103177 A1* | 4/2015 | Slamka | G09B 5/14 |
| | | | 348/158 |
| 2017/0162076 A1 | 6/2017 | Kanuganti et al. | |
| 2018/0106636 A1 | 4/2018 | Hu et al. | |
| 2018/0128622 A1* | 5/2018 | Alataas | G01C 21/005 |
| 2019/0282433 A1* | 9/2019 | Higgins | A61H 3/061 |

OTHER PUBLICATIONS

Malhotra, "Wearable Tech: Tactile Navigation for the Visually Impaired", Distinguished Magazine, Jun. 27, 2018, 4 pages.

* cited by examiner

PORTABLE PEDESTRIAN NAVIGATION SYSTEM

BACKGROUND

Embodiments of the present invention relate to computer-assisted pedestrian navigation, and more particularly, to computer-assisted navigation of a visually impaired person.

A visually impaired pedestrian may find it difficult, in ordinary circumstances, to navigate freely and independently while reliably avoiding obstacles in a crowded environment (whether objects or persons). Various techniques providing partial indoors and outdoors navigation support have been developed in attempts to meet these needs. Some solutions use geographical information and/or different kinds of sensors and/or a wearable electronic image acquisition system to analyze a person's environment for obstacles and communicate navigation information, including obstacle information, to a user via tactile signals.

SUMMARY

Embodiments of the invention may provide a portable pedestrian navigation system, a method of operating such a system, and a computer program product implementing such a method. Additional embodiments of the invention are given in the dependent claims. Embodiments of the present invention can be freely combined with each other if they are not mutually exclusive.

In one aspect, an embodiment of the invention relates to a portable pedestrian navigation system to be ported by a pedestrian. The system includes a computing device, a proximity sensor and an output device. The proximity sensor and the output device are communicatively coupled to the computing device. The computing device receives environmental data at least from the proximity sensor. Based on the environmental data, the computer system identifies a candidate guide entity near the pedestrian. Based on the environmental data, the computer system uses the output device for guiding the pedestrian in accordance with a movement of the identified candidate guide entity as a selected guide entity.

In another aspect, an embodiment of the invention relates to a method of operating a portable pedestrian navigation system to be ported by a pedestrian. The navigation system includes a computing device, a proximity sensor and an output device. The proximity sensor and the output device are communicatively coupled to the computing device. The computing device includes a processor and memory. The memory stores computer-executable instructions which, when executed by the processor, cause the computing device to perform certain functions. The computing device receives environmental data at least from the proximity sensor. Based on the environmental data, the computing device identifies a candidate guide entity near the pedestrian. Based on the environmental data, the computing device uses the output device for guiding the pedestrian in accordance with a movement of the identified candidate guide entity as a selected guide entity.

In a further aspect, an embodiment of the invention relates to a computer program product for operating a portable pedestrian navigation system to be ported by a pedestrian. The navigation system includes a computing device, a proximity sensor and an output device. The proximity sensor and the output device are communicatively coupled to the computing device. The computing device includes a processor and memory. The computer program product includes a computer-readable medium and a set of computer-executable instructions incorporated therewith. The computer-executable instructions, when executed, cause the computing device to perform certain functions of a method. The computing device receives environmental data at least from the proximity sensor. Based on the environmental data, the computing device identifies a candidate guide entity near the pedestrian. Based on the environmental data, the computing device uses the output device for guiding the pedestrian in accordance with a movement of the identified candidate guide entity as a selected guide entity.

BRIEF DESCRIPTION OF THE SEVERAL VIEWS OF THE DRAWINGS

In the following, embodiments of the invention are explained in greater detail, by way of example only, making reference to the drawings in which.

DETAILED DESCRIPTION

Computer-implemented real-time recognition of obstacles and other objects within a changing personal environment is a computationally demanding task with a potential for severe damage and injuries in cases of performance failures. Therefore, there is a need for a mobile pedestrian navigation technology which is more secure and consumes less computational resources.

The current disclosure addresses these issues by providing a system which is capable of providing a secure guidance for visually impaired people that need to walk and arrive at a destination. In an embodiment of the invention, a system is provided that is capable of combining information coming from wearable proximity sensors (like bracelets or shoes with other sensors and/or actors that can interact with a user; for example, devices that vibrate) with further available information, for example from external mobile devices or a GPS navigator unit, to detect obstacles and to recognize that there is a person who is walking in the same direction and at the same speed as the user.

The system may be implemented by a software component ("the plugin" in the following) that is plugged on top of a traditional mobile pedestrian navigation device. The plugin is able to use the existing navigation hardware and/or collaborate with external devices to provide the user with a walking assistance.

In an embodiment, the visually impaired person may wear a wearable device, for example bracelets or shoes with proximity sensors, positioned on both arms and legs or shoes, and actors, vibrators or other tactile output devices capable of indicating a direction. A computing device analyzes the sensor signals together with navigation data (for example, GPS data) and uses the output devices to indicate a direction to the user based on a movement of the person or external device chosen as a guide. Outputs may be of positive type (go ahead, turn right or left), or of negative type (stop; for example, when approaching an obstacle).

The person chosen as a guide can be made aware of being selected as a guide in case the chosen person carries a further mobile computing device, which may have an additional guide software installed, or which may be capable of receiving a notification message (e.g. via SMS) indicating that a guiding sequence has been requested or started. The plugin may be capable of querying the guide software on the nearby device to request a candidate's destination and promote the candidate as a "selected guide".

In an embodiment, in order to set a route for the navigation system, the plugin leverages an explicit declaration from the user, information coming from a calendar event, or an internal extrapolation function of the plugin or system that can provide sections of an estimated route based on the current walking direction.

The navigation system may collect information about a plurality of available candidate guides or concatenate a series of route sections provided by the movement of a plurality of selected guide entities for providing a comprehensive walking assistance. The system may also provide different levels of optimization, for example, by using a guide ranking based on a walking speed or an available or derived indicator for reliability of information.

In an embodiment, at regular time intervals, the system may revalidate the chosen guide entity by checking, for instance, if the guide stops somewhere, and choosing a new guide if necessary and available.

Optionally, the guide may be billed or rewarded using a function of the guide software which is capable of contacting a vendor or bonus system.

Embodiments of the invention may have the advantage that a person (e.g. a visually impaired person or a person visiting an unfamiliar place) can leverage on the view experience of another person walking in the same or a desired direction to avoid obstacles and arrive at a destination in a more secure way. Embodiments of the invention use indicators of human appearance and/or the presence of a mobile computing or telecommunications device to recognize a person who might serve as a guide for the user of the portable pedestrian navigation system disclosed herein.

Expressions such as "near the pedestrian" used herein to indicate a proximity are to be construed as referring to the maximum range within which the portable pedestrian navigation system is capable of identifying a candidate guide entity (the "sensing range").

A "guide entity" may be a human who is available and/or acting as a guide person for the user of the navigation system, and/or a mobile electronic device, preferable a computing device, which is carried by such available or active guide person and is capable of providing information to the portable pedestrian navigation system which can be used by the computing device of the navigation system to determine whether the device and/or the guide person is eligible for guiding the user of the navigation system and/or to guide the user of the navigation system in accordance with a movement of the guide person and/or the mobile device. The expression "person associated with the guide entity" denotes either the guide person if the guide entity is a guide person, or a guide person carrying or owning the guide computing device if the guide entity is a guide computing device.

The expression "guiding the pedestrian in accordance with a movement" refers to providing a signal to the user of the portable pedestrian navigation system which indicates a direction into which the user would have to walk to arrive at a current place of the guide entity while avoiding the same obstacles as the guide entity avoided to reach the current place of the guide entity. The direction(s) thus provided to the user may differ from the route actually taken by the guide entity, for instance in cases when the guide entity's route gets blocked by a transient obstacle. However, it may be possible to reduce the computational effort for determining a route to be pursued by the user of the navigation system in cases when an obstacle can be avoided by taking essentially the same route as the guide entity did previously.

"Environmental data" include any signals and data received by the computing device from sensors and/or communicational devices, units and/or interfaces of the portable pedestrian navigation system. This may include, for example and without limitation, a camera image of the user's environment as well as a response to an availability request for guiding the user of the navigation system.

Non-limiting examples of the computing device include a cell phone, a smartphone, a tablet computer or another mobile computer system comprising dedicated pedestrian navigation hardware.

The term "proximity sensor" refers to any device which is capable of outputting a signal which encodes structural information descriptive of solid and/or liquid structures such that the encoded structural information can be decoded by the computing device. The proximity sensor should be capable of detecting said structures within a preferred maximum range of one or more tens of meters to one or more hundreds of meters, but not necessarily more than one kilometer.

A "guide sequence" or "guiding sequence" is understood herein as any navigation signals provided to the guided pedestrian by the computing device of the portable pedestrian navigation system using the output device. A "identification sequence" is understood herein as any computer-implemented analysis performed by the computing device of the portable pedestrian navigation system which results in a positive or negative classification of a portion of the environmental data as representing the presence of a guide entity, irrespective of whether the identified entity is eligible for acting as a guide for the user of the system or not.

It may be beneficial to allow the computing device analyze whether an identified candidate guide entity is suitable for being selected as the selected guide entity. For this purpose, the computing device may store in its memory one or more eligibility criteria, which may be managed in a user-configurable profile and will be described in more detail below.

According to embodiments, the system may further include a wireless communications unit. The wireless communications unit may be communicatively coupled to the computing device. The computing device may further be adapted for receiving the environmental data from the communications unit. The identification of the candidate guide entity may include implementing a method. The method may include generating an availability request for guiding the pedestrian. The method may further include broadcasting the availability request using the wireless communications unit. In response to the broadcast, the method may receive a response from a candidate computing device. Based on the response, the method may select the candidate computing device as the selected guide entity.

This may have the advantage that the pedestrian may be guided in accordance with the movement of the selected computing device in replacement or addition of a guide person. The movement of a guide computing device (i.e. the candidate computing device which was selected as the selected guide entity) may be less prone to errors than a passive detection of a guide person using the proximity sensor, because the navigation system may receive wireless signals from the guide computing device which may be used to update the current position of the guide computing device. The guide computing device may also serve as a backup guide entity in case that the computing device of the navigation system loses track of the guide person via the proximity sensor, and vice versa, the guide person may serve as a backup guide entity in case that the computing device of the navigation system loses track of the guide computing device via wireless communication unit.

The availability request may comprise a request for any information which may be used by the computing device to determine whether the candidate computing device and/or a candidate guide person associated with the guide computing device is eligible for guiding the user of the navigation system. Such information may include, without limitation, an identifier (name) of the guide computing device and/or the candidate guide person associated with the guide computing device; an age, a gender or a walking velocity of the candidate guide person; an identifier indicating the candidate guide person's willingness to act as a guide; a timestamp indicating data currentness of information related to the candidate guiding person; a length of a route section on which the candidate guide person is expected to be available for guiding; a potential time and/or place of encounter of the pedestrian with the candidate guide person; or a combination thereof.

According to some embodiments, the wireless communications unit has a maximum range between 10 and 250 meters. A maximum range of at least ten meters may ensure that the guided person may speak to the guide person associated with the selected guide computing device, while a larger maximum range may allow for an early search for a guide entity for a subsequent route section, and hence, an early initialization of a guided continuation for the current route section.

According to embodiments, the wireless communications unit comprises a communications interface according to one of the following: IEEE 802.15; IEEE 802.11; Wireless USB; wireless ad hoc network; DASH7; RuBee; Z-Wave; a mobile telecommunications standard; or a combination thereof.

IEEE 802.15 and IEEE 802.11 may be beneficial for providing a large and widespread number of computing devices with communications capabilities within the required range for contacting a candidate computing device. IEEE 802.15 devices include, for example, Bluetooth and ZigBee devices, while IEEE 802.11 device offer a Wireless LAN (WLAN) capability. The term "mobile telephony interface" designates at least the circuitry for communicating via a standard cellular phone network using technologies summarized under one or more of the exemplary cellular network standards GSM 2G, 3G, 4G, 5G and the like. Widespread mobile computing devices such as smartphones and tablet computers use a combination of a mobile telephony interface and one or more IEEE 802 devices (e.g. an LTE telephony, WLAN and Bluetooth). RuBee uses magnetic waves and may therefore be less sensitive to distortions caused by metal objects. Z-Wave and RuBee may be beneficial for offering enhanced power saving capabilities.

According to embodiments, the computing device is further adapted for detecting a coincidence of position, direction and/or velocity between a movement of an object detected using the proximity sensor and a movement of the candidate computing device, the computing device being further adapted for performing the guidance in accordance with the movement of the detected object as an auxiliary guide entity. According to embodiments, the computing device is adapted for performing the identification of the candidate guide entity as a person by analyzing the environmental data with a person recognition algorithm.

These embodiments may be advantageous for enabling the computing device to determine whether a candidate device is actually carried by a walking human, and/or whether a candidate device detected using the wireless communications unit is carried by a candidate person detected using the proximity sensor.

According to embodiments, the computing device is further adapted for performing the guidance of the pedestrian in accordance with a route to be taken by the pedestrian, the identification of the candidate guide entity comprising determining, based on the environmental data, whether a route expected to be taken by the candidate guide entity coincides with at least a section of the route to be taken by the pedestrian.

This may enable the computing device to guide the pedestrian in accordance with the movement of the guide entity along merely a route section instead of waiting for a guide who happens to walk to the same destination as the guided person. An eligibility criterion for accepting the candidate guide entity may comprise rejecting the candidate if the estimated common route section is shorter than a user-defined threshold length (e.g., 100 meters).

According to embodiments, the computing device is further adapted for determining, in case that an updating condition is fulfilled, an updated selected guide entity by repeating the identification of the candidate guide entity, the updating condition relating to a detection of one of the following events in conjunction with the selected guide entity: an interruption of movement for more than a predefined period; a deviation from an expected route by more than a predefined distance; a movement with a velocity out of a predefined velocity range; a movement out of a detection range of the navigation system; an approach of a prospective point of separation from the pedestrian by less than a predefined distance; or a combination thereof.

This may be beneficial for allowing the computing device to guide the user of the navigation system in accordance with the movement of a sequence of guiding entities, and thus provide the safety and reliability of a human guide over a longer portion of the route. For instance, the determination of an updated selected guide entity may be performed on a regular basis (e.g. every 30 seconds, predetermined for the current walk or according to a default configuration), in a scheduled manner (e.g. 10 minutes after starting the guidance or when reaching a predetermined location), or based on a detected event (e.g. when the guide entity is moving out of the sensing range of the proximity sensor, moving too fast or in a wrong direction).

According to embodiments, the computing device is further adapted for receiving a preference information of the pedestrian and performing the guidance of the pedestrian in accordance with the preference information. Preference information refers to any indication, for example, received by the user as a condition for a particular present or future guidance procedure or present in the memory of the computing device as a general or default setting, which the computing device may use to prioritize route options for a particular guidance. The preference information may include, without limitation, a desired arrival time, one or more desirable and/or undesirable geographical locations, and/or relative and/or categorized indications such as air quality, number density of pedestrians, motorized vehicles, etc.

In one example, the preference information includes a desired arrival time of the pedestrian. The computing device may then calculate an estimated arrival time of the selected guide entity and perform the determination of an updated selected guide entity in case that the estimated arrival time of the selected guide entity deviates from the desired arrival time of the pedestrian by more than a predetermined threshold period. This may enable to perform the guidance with a higher probability to arrive at the desired destination on time. For this function, the computing device needs to have received, before or during the guidance procedure, an input specifying the pedestrian's desired destination and arrival time.

The desired destination location and/or arrival time may be specified in various ways, for example as a user input or a calendar event. Arrival time and/or destination may be reconfigurable so that the guidance may result in a more precise navigation, for example to a specific entrance of a sports stadium. An offset period may be provided, for example as a setting in the user-configurable profile, to obtain the possibility of a buffer time. The buffer time may be useful, for example, where the pedestrian wishes to be navigated so as to usually arrive at the destination ten minutes earlier than the time which is assigned to the event.

In particular, the computing device may be configured to discern between an event time and the desired arrival time. This may allow the computing device to guide the pedestrian so as to arrive at the destination at essentially the specified desired arrival time, while on the other hand, in case that the only known time is an event time, to navigate the pedestrian to arrive at the configured offset period relative to the known event time. The offset period may be specified with a sign, i.e. as a negative number indicating that the pedestrian wishes to arrive earlier than the event time, or as a positive number indicating that the pedestrian wishes to arrive later than the event time. Alternatively, the offset period may be specified without a sign and the condition "earlier" or "later" may be implemented as a logical attribute in this case. A later arrival may be beneficial, for example, if the pedestrian expects the event to start with a large crowd which gets smaller after a while (e.g. a sports event or music concert), or for social reasons.

The threshold period may also be specified, for example as a negative number, to indicate that the guide entity should be changed so as to enable an arrival which the pedestrian considers not too early; as a positive number to enable an arrival which the pedestrian considers not too late; and/or a sign-less number to enable an arrival approximately on time, which may be beneficial, for example, for events where the pedestrian wishes to arrive in a relaxed condition or deems an arrival on time to be less important. An approximate arrival time window thus specified may also facilitate a prioritization of multiple available candidate guide entities, so that the computing device may select the guide entity which matches the time window best. The approximate arrival time window may also prevent the computing device from searching for another candidate guide entity too aggressively, for example if the guide entity is calculated to miss the destination by only one minute.

In another example, the preference information comprises one or more desirable and/or undesirable geographical locations. This may provide various benefits to the pedestrian, such as the ability to walk on preferred routes which the pedestrian knows—for example, rather smooth slopes, a small number of obstacles, a route with a preferred number density of other pedestrians, etc. Likewise, the pedestrian may avoid routes through difficult or dangerous areas.

Handling of desirable and/or undesirable geographical locations may require the computing device to be capable of or configured for calculating routes on metadata-enhanced map data (e.g. names of streets or city quarters, current traffic densities, etc.) In particular, the desirable and/or undesirable geographical locations may be: stored as a general setting for all guidance events in a user-configurable profile; for example, as a file or database entry including a list or map metadata; received by the computing device as an event-specific information for a particular future or current guidance procedure; time-independent and/or time-dependent, for example to avoid walking through a park at a predefined time of day, to avoid walking a steep route during winter, to use a pedestrian zone instead of streets with a high density of motorized traffic during predefined or user-configure rush hours, etc.

Accordingly, the user may configure, via a user interface, and store the preference information in a profile stored in the memory of the computing device. The user may toggle binary preference indicators such as "avoid locations with bad air quality", "prefer byroads" or "prefer routes with more pedestrians", and/or select between different templates, such as a setting "Automotive traffic" with an attached dropdown menu offering the options "Low", "Any" and "Avoid rush hours". The computing device may evaluate possible routes according to preconfigured and/or current map data and/or current and/or average traffic data received via an internet connection. Relative information such as "high number density of pedestrians", may be decided based on appropriate threshold values provided, for example as a preconfigured default setting and/or information received via a user input.

In case the computing device determines that the guide entity enters an undesirable geographic location such as an area which is marked as a "potentially dangerous district" or approaches a construction site, the computing device may calculate and navigate the pedestrian along an alternative route and/or determine an updated selected guide entity as described before.

According to embodiments, the system is further adapted for performing the identification of the candidate guide entity based on one of the following: an age, a gender or a walking velocity of a candidate guide person; an identifier indicating the candidate guide person's willingness to act as a guide; a timestamp indicating data currentness of information related to the candidate guiding person; a length of a route section on which the candidate guide person is expected to be available for guiding; a potential time and/or place of encounter of the pedestrian with the candidate guide person; or a combination thereof.

Such information may be received via a response to an availability request which was previously broadcast by the navigation system, a cellular communications network and/or an internet connection. Some or all of the ranges may be managed by the computing device in a user-configurable profile stored in its memory.

The eligibility of a guide can be assessed even when the person transporting the candidate computing device does not have the guiding application installed. In such cases, the response may include a network identifier of the candidate computing device, where identifying the guide person includes submitting a request to an information system to query whether a person assigned to the network identifier is willing to act as a guide. In an example (see also Example 9 further below), the candidate computing device is a mobile phone and the response contains the International Mobile Subscriber Identity (IMSI) of the SIM card assigned to a user of the candidate computing device. The computing device is configured to reject the candidate if the response or the network query reveals that the candidate is not willing to act as a guide.

According to embodiments, the computing device is further adapted for performing the guidance additionally based on a route assigned to the guide entity and/or a route calculated for the pedestrian in case the guidance cannot be continued based on the environmental data. According to embodiments, the computing device is further adapted for performing the guidance based on the route calculated for the pedestrian only if the guidance cannot be continued based on the route assigned to the guide entity.

These embodiments may ensure that the guidance can be continued with an alternative source of navigation if a preferred guiding source is unavailable. It is pointed out, however, that the environmental data received via the proximity sensor, as long as they are available, should be treated with the highest priority as environmental conditions may change, for example after the guide has passed an obstacle or after the calculation of a route to pursued by the pedestrian.

According to embodiments, the system further comprises a location sensor, the location sensor being communicatively coupled to the computing device, the computing device being adapted for receiving location data from the location sensor and performing the guidance and/or the identification using the location data.

This may enable the computing device to guide the pedestrian with a high accuracy and align the current position and/or route with map data stored in its memory. Preferably, the location sensor is a satellite-based navigation system receiver such as a GPS receiver.

According to embodiments, the system further includes an interface for receiving a navigation specification. The interface is communicatively coupled to the computing device and includes one of the following: a microphone; a tactile input device; a wireless communications unit; a wired communications unit; and a combination thereof. The computing device is adapted for performing the guidance and/or the identification based on the received navigation specification.

A navigation specification may include, without limitation, calendar data such as the candidate guide's and/or the guided pedestrian's intended time and/or place of arrival and/or departure; the guide's intended route and/or a previously calculated route to be taken by the guided pedestrian; forecasted and/or measured weather data; and/or a command by the user. This may enable the computing device, amongst other potentially advantageous functions, to predetermine a route for the user of the navigation system which takes most advantage of presumably available guide persons; to output an alarm signal to notify the user that departure is due to join a particular guide person on the way; to calculate an alternative route if the guided user deviates from an originally calculated or received route; and/or to accept commands, for example to spontaneously change the route, the destination and/or the guide entity.

According to embodiments, the proximity sensor comprises one of the following: an optical sensor, an infrared sensor, a radar sensor, an ultrasonic sensor; or a combination thereof. These exemplary technologies may provide the computing device with high-quality environmental data to enable a comprehensive, reliable and highly resolved detection of objects, obstacles and/or persons near the pedestrian.

According to embodiments, the output device includes one of the following: a tactile actor; a loudspeaker; a visual display; or a combination thereof. These technologies may provide computer-assisted navigation to the user with particular advantages depending on the specific usage situation. For example, a loudspeaker may enable a more precise navigation output while a tactile actor may be more reliable in a loud environment (e.g. a busy street). A visual display may enable comfortable navigation for a user who is not visually impaired, but wants to use computer-assisted navigation to walk in an unfamiliar environment.

According to yet another aspect, the invention relates to a second computer program product (which is also referred to herein as a "guide application", "guide software" or "guide plugin"). The second computer program product includes a second set of computer-executable instructions incorporated with a second computer-readable medium. The computer-executable instructions of the second set are adapted to cause a further computing device, when executed by a processor of the further computing device, to receive an availability request for guiding the pedestrian, and in response to receiving the request, generate a response from a candidate computing device. The response includes one of the following: an age, a gender or an expected walking velocity of an available guiding person; an identifier indicating the available guiding person's willingness to act as a guide; a timestamp indicating data currentness; time and/or place of starting and/or arrival; a route to be taken by the available guiding person; an expected time and place of encounter; an identifier for the available guiding person; or a combination thereof.

Such guide application may enable the further computing device to generate and transmit a response to an availability request from the portable pedestrian navigation system. The response may include user-configurable content which may be stored as a guide profile in the memory of the further computing device.

According to embodiments, the computer-executable instructions of the second set are further adapted to cause the further computing device, when executed by the processor of the further computing device, to report, upon completion of the guidance, characteristics of the guidance to a computing system (typically a remote server in a network) for billing or rewarding the available guiding person. This may increase the popularity of the guide application and may therefore have the technical effect of increasing the probability that the user of the portable pedestrian navigation system receives a response to an availability request. Especially when moving in a crowded area, the user may benefit from the ability to select the most suitable guide for a given navigation task.

According to embodiments, the method further includes performing the following steps using the portable pedestrian navigation system. The portable pedestrian navigation system receives navigation information descriptive of at least a desired destination to be reached by the pedestrian. The portable pedestrian navigation system calculates a route for the pedestrian to reach the destination from the current position, and broadcasts an availability request for guiding the pedestrian. In response to the broadcast, the portable pedestrian navigation system receives a response from a candidate computing device. Based on the response, the portable pedestrian navigation system selects the candidate computing device as the selected guide entity. At a regular time interval, portable pedestrian navigation system determines whether an updating condition is fulfilled, and if the updating condition is fulfilled, determines an updated selected guide entity by repeating the identification of the candidate guide entity. The portable pedestrian navigation system reports, upon completion of the guidance, characteristics of the guidance to a computing system for billing or rewarding a person associated with the guide entity.

Figure 1:
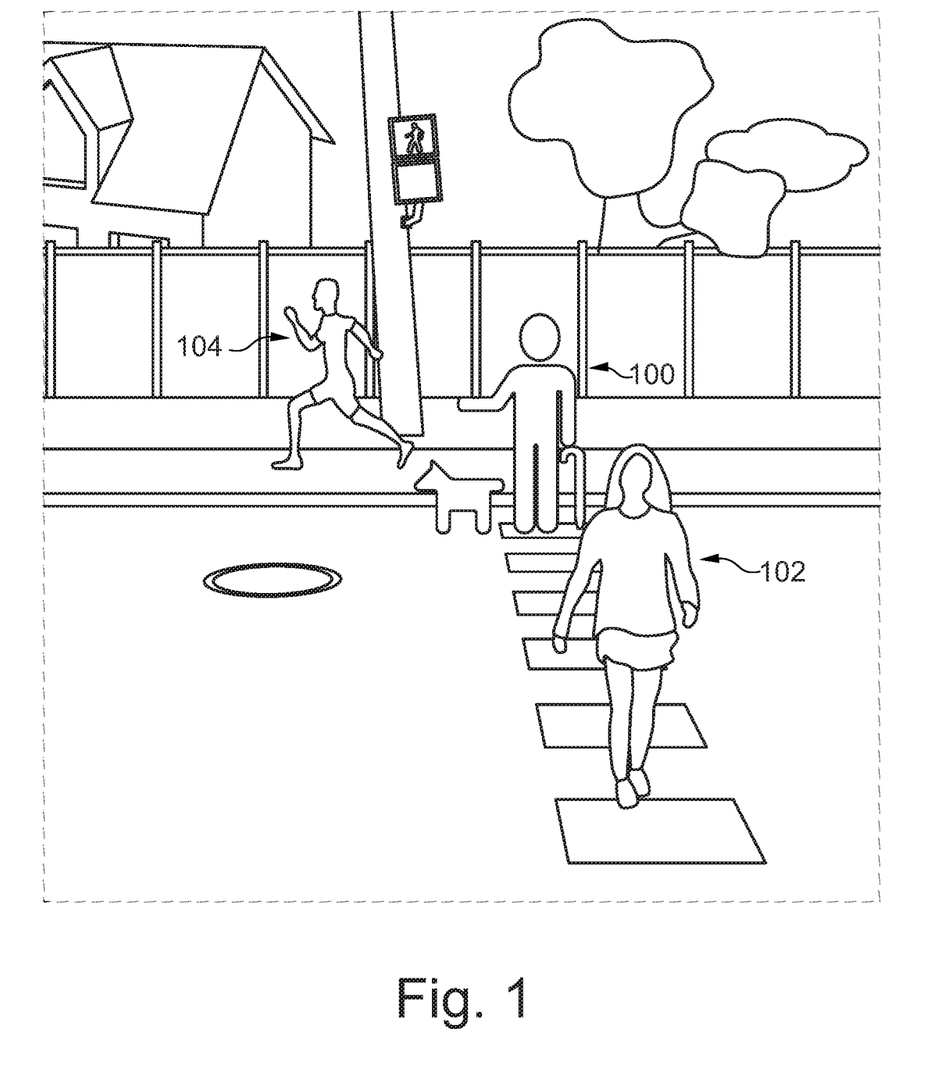
FIG. 1 depicts a schematic usage situation of a portable pedestrian navigation system.

Now turning to the drawings, FIG. 1 is a schematic illustration which shows an exemplary situation where a guided person 100 (depicted as a visually impaired person 100 at the center of the image) uses a portable pedestrian navigation system 200 to walk along a route by following a guide entity 102 (in the foreground; either a guide person 102 as depicted or a guide computing device 102 carried by the guide person 102) that was previously identified 302 and selected by the portable pedestrian navigation system 200. The guide person 102 and the guided person 100 are crossing a street, wherein the guide person 102 is walking a few meters ahead of the guided person 100, within a sensing range of the navigation system 200. Another person 104 within the sensing range of the navigation system 200 is running on the sidewalk in the background of the drawing. The running person 104 was not selected as a guide by the navigation system 200 because the navigation system 200 previously determined that the running person 104 has a too high velocity to be followed by the guided person 102.

The use situation of the portable pedestrian navigation system 200 used by pedestrian 100 is only a limited, non-exhaustive example by which some of the possible functions of the system 200 can be demonstrated. Numerous further functions and effects of the portable pedestrian navigation system 200 will become apparent in the following examples of use. All elements of all examples given may be freely combined wherever this is technically possible.

EXAMPLE 1

Figure 2:
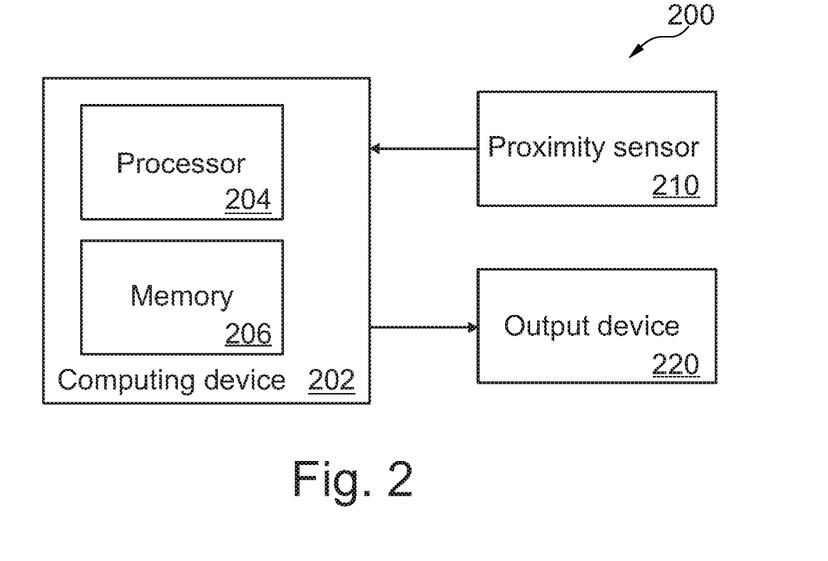
FIG. 2 is a schematic overview of a portable pedestrian navigation system.

The computing device 202 uses the proximity sensor 210 to detect an object which is moving into the same direction as the pedestrian 100 or into a desired direction at a speed within a preferred speed range. Optionally, the computing device 202 executes a person recognition algorithm on the received environmental data which analyzes, for example, the dimensions or appearance of the detected object to determine a probability that the detected object is a human.

In this example, it is not necessary for the computing device 202 to know a route which was previously determined to be followed by the guided person 100 or a destination which the guided person 100 is supposed to approach. It is sufficient that the computing device 202 can use the proximity sensor 210 to track the movement of the detected guide entity 102 so that it can direct the guided person 100 on essentially the same way as the guide entity 102. This may allow the guided person 100 to walk along a route which has a high probability of being free of obstacles.

In an alternative situation, the computing device 202 compares the direction of the detected object to a route which was calculated or received for the guided person 100 to reach a desired destination. Additionally, the computing device 202 has stored in its memory 206 a preferred velocity range at which the guided person 100 is supposed to feel comfortable to walk. If, for instance, the direction of the detected object is within plus-minus 10 degrees relative to the current walking direction according to the predetermined route and its detected velocity is within the preferred velocity range, the computing device 202 accepts the detected object as a selected guide entity 102 and starts to direct the guided person 100 in accordance with the route which is actually pursued by the selected guide entity 102 instead of the previously determined route.

Figure 3:
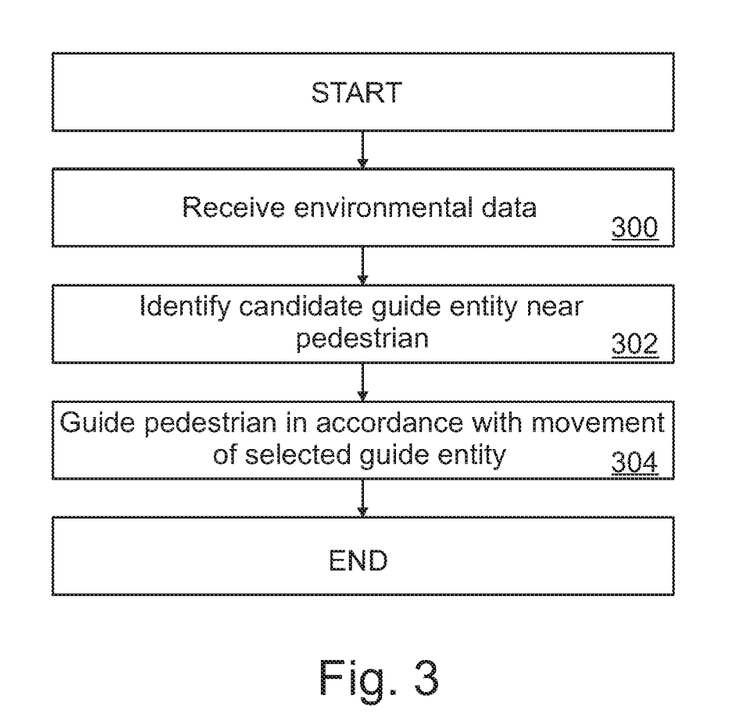
FIG. 3 visualizes a method of operating a portable pedestrian navigation system.

In both alternatives of the current example, the computing device 202 continues to cause the guided person 100 to follow the selected guide entity 102 until, for instance, it receives a contrary navigation specification by the guided person 100, such as a voice command like "stop follow" via a microphone. Alternatively or additionally, the computing device 202 may stop guiding 304 the guided pedestrian 100 in case that it determines that the guided person 100 does not continue to follow the guiding direction provided via the output device 220 for more than a predefined period, for example, 15 seconds. Alternatively or additionally, a stopping criterion might be a deviation of the guide person's 102 direction and/or distance with respect to the direction or distance of the guided person 100 or a route that was previously determined for the guided person 100. Various other stopping criteria may be applied according to further envisioned usage situations.

Example 1 demonstrates a case where the portable pedestrian navigation system 200 achieves a navigation 304 of the pedestrian 100 with particularly low hardware requirements. The computing device 202 identifies 302 the moving object as a candidate guide entity 104 using the proximity sensor 210 and guides 304 the pedestrian 100 according to the object movement using the output device 220. No further components, devices or units are required for the performance of the navigation system 200 and the guide person 102 can act as a guide without having to carry a detectable electronic device such as a mobile phone, a smartphone or a tablet computer.

EXAMPLE 2

The pedestrian 100 is walking in an area where five further pedestrians 104 are present in a radius of 100 meters around the pedestrian 100 carrying the portable pedestrian navigation system 200. The navigation system 200 additionally comprises a wireless communications unit according to the Bluetooth standard which the computing device 202 uses for broadcasting an availability request. In response to the broadcast, the navigation system 200 receives 300 one response from a smartphone carried by one of the five further pedestrians 104. The navigation system 200 uses Bluetooth triangulation to determine the distance, velocity and direction of the responding device. As the computing device 202 is configured to accept a candidate computing device 104 at any distance within the range of the Bluetooth communications unit, it proceeds by performing a comparison of the determined velocity vector of the answering device to a previously determined route along which the computing device 202 is currently guiding 304 the pedestrian 100. It determines that the direction of the velocity vector is within plus-minus 10 degrees relative to the current navigation direction of the predetermined route, and that the velocity of the candidate device 104 is within the desired velocity range of 40-100 meters per minute. Hence, the computing device 202 selects the responding candidate device 104 as the selected guide entity 102 and continues to direct the guided person 100 along the route pursued by the selected device 102. In the alternative case that the computing device 202 receives no response, the computing device 202 continues to direct the guided person 100 along the previously determined walking route.

EXAMPLE 3

While the person 100 to be guided by the navigation system 200 is walking in an area with a large number of further pedestrians 104 (e.g. 30 further pedestrians 104 within a radius of 10 meters around the navigated pedestrian 100), the navigation system 200 broadcasts an availability request for guiding the pedestrian 100 and receives 300 a response from a large number of candidate computing devices 104 which are available for guiding the pedestrian 100. In addition to other applicable eligibility criteria, the computing device 202 now applies a selection criterion to determine the most preferable candidate 104. Selection criteria may comprise, for instance, determining the candidate device 104 which is located at the shortest distance from the person 100 to be guided or which ranks highest according to a score which is calculated by the computing device 202 of the navigation system 200 or the responding candidate computing device 104 based on the available information about the candidate guide person 104 assigned to the candidate computing device 104, such as an age, a gender or a walking velocity of the candidate guide person 104 or an identifier indicating the candidate guide person's 104 willingness to act as a guide.

EXAMPLE 4

The portable pedestrian navigation system 200 is guiding 304 the guided person 100 in accordance with a movement of a selected guide entity 102. The guide entity 102 is moving slightly faster than the guided pedestrian 100 and moves out of the sensing range of the navigation system 200 after a while. As the navigation system 200 loses contact to the guide entity 102, the computing device 202 first continues to guide 304 the pedestrian 100 along the remaining route which was recorded from the movement of the guide entity 102. If the navigation system 200 cannot restore the contact to the guide entity 102 until this point, it continues to guide 304 the guided person 100 along a route which was either determined before the guiding sequence in accordance with the movements of the guide entity 102 who moved out of range was started, or it calculates a new route towards a known destination or a transitional route section towards a previously determined route.

EXAMPLE 5

The portable pedestrian navigation system 200 is guiding 304 the guided person 100 in accordance with the movement of a selected guide entity 102 while the person 102 associated with the guide entity 102 notices a bus stopping nearby and spontaneously decides to continue travelling by bus. The guide person 100 enters the bus and the bus leaves the station without the guided pedestrian 100. The navigation system 200 then determines that the guide entity's 102 velocity exceeds the maximum acceptable velocity which was configured previously by the guided pedestrian 100 and continues to guide 304 the guided pedestrian 100 along a calculated route as previously described, for example, in example 4.

EXAMPLE 6

The navigation system 200 is guiding 304 the guided person 100 in accordance with the movements of a selected guide entity 102 while the guide person 102 associated with the guide entity 102 encounters a traffic light which is showing a "stop" signal. The navigation system 200 determines that the velocity of the guide entity 102 has become zero and starts observing the time during which the guide entity's 102 velocity remains zero. The computing device 202 is configured to repeat the identification sequence 302 for a candidate guide entity 104 in case that the velocity of the selected guide entity 102 does not return to the preferred velocity range within 30 seconds. However, the traffic light changes its signal to "walk" after 18 seconds and the guide person 102 continues to walk crossing the street. In response, the navigation system 200 continues to guide 304 the guided pedestrian 100 in accordance with the movement of the selected guide entity 102.

In an alternative example, the traffic light signal does not change from "stop" for 46 seconds. After 30 seconds of halting, the navigation system 200 starts the sequence for identifying 302 a new candidate guide entity 104 for the purpose of determining a new selected guide entity 102 which is able to guide 304 the pedestrian 100 wearing the portable pedestrian navigation system 200 with a velocity within the preferred walking velocity range. The navigation system 200 identifies 302 another person 104 who is waiting at the traffic light. However, the computing device 202 determines that the velocity of the new candidate 104 is also zero, and therefore does not set the new candidate guide entity 104 as the selected guide entity 102. After 46 seconds, the originally selected guide entity 102 continues to walk crossing the street and the navigation system 200 continues to guide 304 the guided pedestrian 100 in accordance with the movement of the original selected guide entity 102.

EXAMPLE 7

The portable pedestrian navigation system 200 is guiding 304 the guided pedestrian 100 in accordance with the movement of the selected guide entity 102 as the guide person 102 associated with the selected guide entity 102 meets a friend, stops walking and starts talking for 5 minutes. After a user-configured waiting time of 1 minute the navigation system 200 restarts the sequence for identifying 302 a candidate guide entity 104 in order to determine a new guide entity 102 which can serve as the selected guide entity 102. After 170 seconds the navigation system 200 senses that another pedestrian 104 is approaching who fulfills the eligibility criteria to become selected as a guide entity 102. The navigation system 200 thus selects the new candidate guide entity 104 associated with the approaching pedestrian 104 as a new selected guide entity 102, but does not start guiding 304 the guided pedestrian 100 in accordance with the movement of the new selected guide entity 102 because it has determined that the approaching pedestrian 104 has not yet arrived and overtaken the guided pedestrian 100 in the direction which was previously pursued by the guiding sequence in accordance with the movement of the former selected guide entity 102. The navigation system 200 waits until the new selected guide entity 102 arrives at a distance of, for example, 2 meters in the desired direction before the computing device 202 continues to guide 304 the guided pedestrian 100 in accordance with the movement of the new selected guide entity 102.

EXAMPLE 8

While following the route taken by the selected guide entity 102, the computing device 202 determines using the proximity sensor 210 that a moving obstacle has moved into the guide's 102 path. The computing device 202 is configured to treat the environmental data received from the proximity sensor 210 with a higher priority than the walking route of the guide 102 determined from the movement of the selected guide entity 102. In response, the computing device 202 starts calculating a safe evasive maneuver around the moving obstacle, which may include waiting until the moving obstacle has passed by. The navigation system 200 then continues to guide 304 the guided pedestrian 100 along the evasive route until the guided pedestrian 100 has reached the route of the guide entity 102 again and then proceeds to navigate 304 the guided person 100 in accordance with the movement of the selected guide entity 102 as before.

EXAMPLE 9

The portable pedestrian navigation system 200 is additionally equipped with a communications interface for a cellular telephony network. The computing device 202 recognizes a candidate guide person 104 in the environmental data received from the proximity sensor 210. The computing device 202 then uses the cellular telephony interface to determine that the candidate guide person 104 is carrying a mobile phone which is also participating in the cellular telephony network. Via the cellular telephony network, the computing device 202 receives 300 the international mobile subscribe identity (IMSI) of the SIM card which is assigned to the candidate guide person 104. The computing device 202 then uses the received IMSI to request from the network provider whether the candidate guide person 104 is willing to act as a guide for any person 100 using the portable pedestrian navigation system 200. The provider looks up the requested information in a database and submits the requested information in a response to the portable navigation system 200. The computing device 202 then determines from the received response that the candidate guide person 104 is willing to act as a guide and eventually selects the candidate guide person 104 who is contacted by the proximity sensor 210 as well as the mobile phone carried by the candidate guide person 104 and contacted using the mobile telephony interface as two alternative selected guide entities 102.

In this way, the computing device 202 is enabled to continue following the selected guide person 102 even if either the proximity sensor 210 or the mobile telephony interface loses contact to the selected guide person 102 or, respectively, the mobile phone carried by the selected guide person 102. A further advantage demonstrated by this example is that no additional software has to be installed on the mobile phone of the candidate guide person 104 for responding to an availability request of the portable pedestrian navigation system 200.

EXAMPLE 10

The computing device 202 has detected a candidate computing device 104 which fulfills all criteria for serving as the selected guide entity 102, with the only exception that the destination of the guide person 102 associated with the candidate computing device 104 is different from the destination selected by the guided pedestrian 100. However, the computing device 202 calculates or receives a calculated route to the guide's 102 destination and determines that the route calculated for the guide entity 102 runs close to a route which was calculated for the pedestrian 100 by not more than a user-configured distance of 200 meters along a route section of a length which exceeds another user-configured threshold length of 100 meters of common route section. In response, the computing device 202 selects the candidate computing device 104 as the selected guide entity 102, continues to navigate 304 the guided pedestrian 100 along the determined common route section in accordance with the movement of the selected guide entity 102 and eventually proceeds with identifying 302 a new candidate guide entity 104 and guides 304 the guided person 100 further along a calculated route if no new candidate guide entity 104 is available or in accordance with the movement of a new selected guide entity 102 if a new candidate guide entity 104 is found to be eligible to serve as the selected guide entity 102.

FIG. 2 is a schematic block diagram of an exemplary portable pedestrian navigation system 200. The system 200 comprises a computing device 202, a proximity sensor 210 and an output device 220. The computing device 202 comprises at least a processor 204, memory 206 and interfaces for communicatively connecting the proximity sensor 210 and the output device 220. The proximity sensor 210 and the output device 220 are communicatively connected to the respective interfaces of the computing device 202. Non-limiting examples for the proximity sensor 210 include an optical sensor (e.g., a digital camera), an infrared sensor, a radar sensor, an ultrasonic sensor, or a combination thereof. Non-limiting examples for the output device 220 include a tactile actor; a loudspeaker; a visual display; or a combination thereof.

All components of the pedestrian navigation system 200 are portable in combination by a pedestrian 100. This includes typical hardware specifications such as weight limitations and battery power supply. The computing device 202 may comprise, without limitation, a cell phone, a smartphone, a tablet computer or another mobile computer system comprising dedicated pedestrian navigation hardware. The proximity sensor 210 and/or the output device 220 may be integrated in clothes or accessories to be worn by the pedestrian 100, like bracelets or shoes with proximity sensors 210, positioned on both arms and legs or shoes, and actors, vibrators or other tactile output devices 220 capable of indicating a direction to the pedestrian 100.

The computing device 202 has stored in its memory 206 computer-executable instructions which, when executed by the processor 204, cause the computing device 202 to receive 300 environmental data at least from the proximity sensor 210; based on the environmental data, identify 302 a candidate guide entity 104 near the pedestrian 100; and based on the environmental data, use the output device 220 for guiding 304 the pedestrian 100 in accordance with a movement of the identified candidate guide entity 104 as a selected guide entity 102 as described herein. A guide entity 102, 104 may be a guide person 102, 104 or a guide computing device 102, 104.

The system may comprise further devices and units which are communicatively and/or controllably connected to the computing device 202, examples of which include, without limitation, a wireless communications unit (e.g. a Bluetooth unit comprising chipset, transceiver and antenna), a location sensor (e.g. a receiver for a satellite-based positioning system such as GPS, Galileo, GLONASS, Beidou, etc.), and/or a data exchange interface, including a suitable interface for receiving a navigation specification such as a microphone, a tactile input device, a wireless communications unit, a wired communications unit or a combination thereof. In these implementations, the computing device 202 is adapted for performing the identification 302 of the candidate guide entity 104 and/or the guidance of the pedestrian 100 in accordance with a movement of the candidate guide entity 104 as a selected guide entity 102 further based on information received from such further devices and units.

FIG. 3 is a schematic representation of a method for operating a portable pedestrian navigation system 200 to be ported by a pedestrian 100 as described herein. The method comprises, using the computing device 202 of the system, receiving 300 environmental data at least from the proximity sensor 210; based on the environmental data, identifying 302 a candidate guide entity 104 near the pedestrian 100; and based on the environmental data, use the output device 220 for guiding 304 the pedestrian 100 in accordance with a movement of the identified candidate guide entity 104 as a selected guide entity 102.

The step of receiving 300 environmental data may include receiving the environmental data from other sources such as a wireless communications system. The step of identifying 302 a candidate guide entity 104 may comprise one or more sub-steps such as evaluating the environmental data under one or more eligibility criteria such as an age of a candidate guide person 104 associated with the detected candidate guide entity 104. The step of guiding 304 the pedestrian 100 may comprise one or more sub-steps such as calculating a route segment for avoiding a temporary obstacle. The method may comprise additional steps such as reporting, upon completion of the guidance, characteristics of the guidance (e.g. time of completion of the guidance, name of the guide person 102 and/or the guided pedestrian 100, length of the route along which the pedestrian 100 was guided by the guide entity 102, etc.) to a computing system for billing or rewarding the available guide person 102.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A portable pedestrian navigation system for carrying by a pedestrian, the system comprising a computing device, a proximity sensor and an output device, the proximity sensor and the output device being communicatively coupled to the computing device, the system further comprising a processor and memory storing computer-executable instructions which, when executed by the processor, cause the system to perform functions of:
   receiving environmental data at least from the proximity sensor;
   based on the environmental data, identifying a candidate guide entity near the pedestrian, wherein the guide entity is a person; and
   based on the environmental data, using the output device for guiding the pedestrian in accordance with a movement of the identified candidate guide entity as a selected guide entity, wherein the guiding comprises:
      providing a signal to the pedestrian which indicates a direction into which the pedestrian would have to walk to arrive at a current place of the guide entity while avoiding one or more obstacles avoided by the guide entity to reach the current place of the guide entity.

2. The system of claim 1, further comprising a wireless communications unit, the wireless communications unit being communicatively coupled to the computing device, the memory storing further instructions for receiving the environmental data from the communications unit, the identification of the candidate guide entity comprising:
   generating an availability request for guiding the pedestrian;
   broadcasting the availability request using the wireless communications unit;
   in response to the broadcast, receiving a response from a candidate computing device; and
   based on the response, selecting the candidate computing device as the selected guide entity.

3. The system of claim 2, the wireless communications unit having a maximum range between 10 and 250 meters.

4. The system of claim 2, the wireless communications unit comprising a communications interface according to one of the following:
   IEEE 802.15; IEEE 802.11; Wireless USB; wireless ad hoc network; DASH7; RuBee; Z-Wave; a mobile telecommunications standard; or a combination thereof.

5. The system of claim 2, the memory storing further instructions for detecting a coincidence of position, direction and/or velocity between a movement of an object detected using the proximity sensor and a movement of the candidate computing device, and instructions for performing the guidance in accordance with the movement of the detected object as an auxiliary guide entity.

6. The system of claim 1, the memory storing further instructions for performing the identification of the candidate guide entity as a person by analyzing the environmental data with a person recognition algorithm.

7. The system of claim 1, the memory storing further instructions for performing the guidance of the pedestrian in accordance with a route to be taken by the pedestrian, the identification of the candidate guide entity comprising determining, based on the environmental data, whether a route expected to be taken by the candidate guide entity coincides with at least a section of the route to be taken by the pedestrian.

8. The system of claim 1, the memory storing further instructions for receiving a preference information of the pedestrian and performing the guidance of the pedestrian in accordance with the preference information.

9. The system of claim 1, the memory storing further instructions for determining, in case that an updating condition is fulfilled, an updated selected guide entity by repeating the identification of the candidate guide entity, the updating condition relating to a detection of one of the following events in conjunction with the selected guide entity:
   an interruption of movement for more than a predefined period; a deviation from an expected route by more than a predefined distance; a movement with a velocity out of a predefined velocity range; an approach of a prospective point of separation from the pedestrian by less than a predefined distance; or a combination thereof.

10. The system of claim 1, the memory storing further instructions for performing the identification of the candidate guide entity based on one of the following:
   a walking velocity of a candidate guide person; a timestamp indicating data currentness of information related to the candidate guiding person; a length of a route section on which the candidate guide person is expected to be available for guiding; a potential time and/or place of encounter of the pedestrian with the candidate guide person; or a combination thereof.

11. The system of claim 1, the memory storing further instructions for performing the guidance additionally based on a route assigned to the guide entity and/or a route calculated for the pedestrian in case the guidance cannot be continued based on the environmental data.

12. The system of claim 11, the memory storing further instructions for performing the guidance based on the route calculated for the pedestrian only if the guidance cannot be continued based on the route assigned to the guide entity.

13. The system of claim 1, further comprising a location sensor, the location sensor being communicatively coupled to the computing device, the memory storing further instructions for receiving location data from the location sensor and performing the guidance and/or the identification using the location data.

14. The system of claim 1, further comprising an interface for receiving a navigation specification, the interface being communicatively coupled to the computing device and comprising one of the following:
   a microphone; a tactile input device; a wireless communications unit; a wired communications unit; and a combination thereof, the computing device being adapted for performing the guidance and/or the identification based on the received navigation specification.

15. The system of claim 1, the proximity sensor comprising one of the following:
an optical sensor, an infrared sensor, a radar sensor, an ultrasonic sensor; or a combination thereof.

16. The system of claim 1, the output device comprising one of the following:
a tactile actor; a loudspeaker; a visual display; or a combination thereof.

17. A method of operating a portable pedestrian navigation system for carrying by a pedestrian, the navigation system comprising a computing device, a proximity sensor and an output device, the proximity sensor and the output device being communicatively coupled to the computing device, the computing device comprising a processor and memory, the memory storing computer-executable instructions which, when executed by the processor, cause the computing device to:
receive environmental data at least from the proximity sensor;
based on the environmental data, identify a candidate guide entity near the pedestrian, wherein the guide entity is a person; and
based on the environmental data, use the output device for guiding the pedestrian in accordance with a movement of the identified candidate guide entity as a selected guide entity, wherein the guiding comprises:
providing a signal to the pedestrian which indicates a direction into which the pedestrian would have to walk to arrive at a current place of the guide entity while avoiding one or more obstacles avoided by the guide entity to reach the current place of the guide entity.

18. The method of claim 17, wherein the system further comprises a wireless communications unit, the wireless communications unit being communicatively coupled to the computing device, the method further comprising receiving the environmental data from the communications unit, the identification of the candidate guide entity comprising:

generating an availability request for guiding the pedestrian;
broadcasting the availability request using the wireless communications unit;
in response to the broadcast, receiving a response from a candidate computing device; and
based on the response, selecting the candidate computing device as the selected guide entity.

19. The method of claim 18, further comprising detecting a coincidence of position, direction and/or velocity between a movement of an object detected using the proximity sensor and a movement of the candidate computing device, and performing the guidance in accordance with the movement of the detected object as an auxiliary guide entity.

20. A computer program product for operating a portable pedestrian navigation system for carrying by a pedestrian, the navigation system comprising a computing device, a proximity sensor and an output device, the proximity sensor and the output device being communicatively coupled to the computing device, the computing device comprising a processor and memory, the computer program product comprising a non-transitory computer-readable medium and a set of computer-executable instructions incorporated therewith, the computer-executable instructions being adapted to cause the computing device, when executed by the processor, to:
receive environmental data at least from the proximity sensor;
based on the environmental data, identify a candidate guide entity near the pedestrian, wherein the guide entity is a person; and
based on the environmental data, use the output device for guiding the pedestrian in accordance with a movement of the identified candidate guide entity as a selected guide entity, wherein the guiding comprises:
providing a signal to the pedestrian which indicates a direction into which the pedestrian would have to walk to arrive at a current place of the guide entity while avoiding one or more obstacles avoided by the guide entity to reach the current place of the guide entity.

* * * * *